United States Patent
Hornung et al.

(10) Patent No.: US 9,222,753 B2
(45) Date of Patent: Dec. 29, 2015

(54) RETICLE FOR A TELESCOPE

(71) Applicant: Carl Zeiss Sports Optics GmbH, Wetzlar (DE)

(72) Inventors: Thomas Hornung, Bad Homburg (DE); Christoph-Hilmar vom Hagen, Giessen (DE); Juergen Mattern, Wetzlar (DE)

(73) Assignee: Carl Zeiss Sports Optics GmbH, Wetzlar (DE)

( * ) Notice: Subject to any disclaimer, the term of this patent is extended or adjusted under 35 U.S.C. 154(b) by 239 days.

(21) Appl. No.: 13/936,738

(22) Filed: Jul. 8, 2013

(65) Prior Publication Data

US 2014/0007486 A1 Jan. 9, 2014

Related U.S. Application Data

(60) Provisional application No. 61/668,756, filed on Jul. 6, 2012.

(51) Int. Cl.
*G02B 23/00* (2006.01)
*F41G 1/34* (2006.01)
*G02B 27/34* (2006.01)
(Continued)

(52) U.S. Cl.
CPC ...... *F41G 1/345* (2013.01); *F41G 1/38* (2013.01); *G02B 27/34* (2013.01); *G02B 5/0221* (2013.01)

(58) Field of Classification Search
CPC ............... F41G 1/12; F41G 1/16; F41G 1/40; F41G 3/326; G02B 23/14; G02B 23/145; G02B 27/34; G02B 23/00; G02B 23/10
USPC .................. 359/424, 423, 422, 427, 428, 505
See application file for complete search history.

(56) References Cited

U.S. PATENT DOCUMENTS

| | | | |
|---|---|---|---|
| 1,302,353 A * | 4/1919 | Friedrich | G02B 27/34 250/467.1 |
| 4,792,673 A | 12/1988 | Blackler | |
| 6,729,062 B2 | 5/2004 | Thomas et al. | |

(Continued)

FOREIGN PATENT DOCUMENTS

GB 2 346 705 A 8/2000

OTHER PUBLICATIONS

Search report of the European Patent Office dated Sep. 27, 2013 in the corresponding European patent application 13175079.6-1562.

(Continued)

*Primary Examiner* — Scott J Sugarman
*Assistant Examiner* — Sharrief Broome
(74) *Attorney, Agent, or Firm* — Walter Ottesen P.A.

(57) ABSTRACT

The invention relates to a reticle with a visible pattern in a transparent substrate for a telescope. The pattern of the reticle is made of open grooves which are engraved in a surface of the transparent substrate, wherein the engraved open grooves define groove surfaces at an angle to said substrate surface in which the open grooves are engraved. The groove surfaces have a surface roughness which is large enough to scatter light directed onto the reticle perpendicular to the substrate surface when the reticle is illuminated in transmission mode, such that the pattern becomes visible relative to the remaining substrate surface by said light scattering at the groove surfaces in the transmission mode when viewed from a direction perpendicular to the substrate surface. The reticle is produced with direct laser engraving of the grooves.

14 Claims, 6 Drawing Sheets

(51) Int. Cl.
*F41G 1/38* (2006.01)
*G02B 5/02* (2006.01)

(56) References Cited

U.S. PATENT DOCUMENTS

| | | | |
|---|---|---|---|
| 7,471,452 | B2 | 12/2008 | Schreiter et al. |
| 2004/0016168 | A1* | 1/2004 | Thomas et al. ............... 42/122 |
| 2004/0085631 | A1 | 5/2004 | Mueller |
| 2004/0167542 | A1* | 8/2004 | Solar et al. .................. 606/130 |
| 2007/0227586 | A1* | 10/2007 | Zapalac, Jr. .................. 136/252 |

OTHER PUBLICATIONS

Shimotsuma, Y. et al, "Three-Dimensional Micro- and Nano-Fabrication in Transparent Materials by Femtosecond Laser", Japanese Journal of Applied Physics, vol. 44, No. 7A, 2005, pp. 4735 to 4748.

Qiu, J. et al, "Femtosecond laser-induced microfeatures in glasses and their applications", Journal of Non-Crystalline Solids, vol. 354, Issues 12-13, 2008, abstract.

Yang, L. et al, "Microdroplet deposition of copper film by femtosecond laser-induced forward transfer", Applied Physics Letters, vol. 89, Issue 16, 2006, American Institute of Physics, abstract.

Kononenko, V. et al, "Activation of color centers in bismuth glass by femtosecond laser radiation", The Smithsonian/NASA Astrophysics Data System, Laser Physics, vol. 21, Issue 9, downloaded May 29, 2012, abstract.

LMM14 Black for Metal (General Purpose), www.thermark.com/content/view/35/78, 2008, TherMark Holdings Inc., downloaded May 29, 2012.

Ashkenasi, D. et al, "Picosecond laser-induced color centers in glass optics", Journal of Laser Applications, vol. 23, Issue 1, 2011, Laser Institute of America, abstract.

Riester, D. et al (Contacts), "Table-Top System for Laser Induced Forward Transfer: Protoprinter", Fraunhofer Institute for Laser Technology ILT, www.ilt.fraunhofer.de.

Jamshidi-Ghaleh, K. et al, "IR Femtosecond Laser-induced Modification of Photochromic Glasses", European Physical Journal, Applied Physics-EPJ, www.scribd.com/doc/51078025/IR-Femtosecond-Laser-induced-Modification-of-Photochromic-Glasses, abstract.

"Innovation Nation: Tiny Batteries", Science360 News Service, video, news.science360.gov/archives/20110331, downloaded May 29, 2012, one page.

Graitzer, E. et al, "Correcting image placement errors using registration control (RegC) technology", SPIE Digital Library, Proc. SPIE 7973, 797312 (2011), http://dx.doi.org/10.1117/12.879885, abstract.

"Chapter 2 The History of Laser Forward Transfer Techniques", pp. 10 to 39.

Pique, A. et al, "Laser-Induced Forward Transfer Direct-Write of Miniature Sensor and Microbattery Systems", LAMP 2002, Osaka, Japan, Proceedings paper #1241 preprint, pp. 1 to 7.

Atre, A. et al, "LiCoO2 Texturing by Laser Induced Forward Transfer for Printed Microbatteries", 8 pages.

Adams, M., "What Are the Crosshairs on Scopes Made Of?", http://www.ehow.com/info_8222468_crosshairs-scopes-made.html, downloaded May 29, 2012, three pages.

"Rifle Scope Reticles", http://support.pentaximaging.com/node/427, downloaded May 29, 2012, one page.

"Demos", HORUS Vision, video, http://horusvision.com/demos.php, 2012 Horus Vision LLC, one page.

Duparre, A. et al, "Surface characterization techniques for determining the root-mean-square roughness and power spectral densities of optical components", Applied Optics, vol. 41, No. 1, Jan. 2002, pp. 154 to 171, Optical Society of America.

Ben-Yakar, A. et al, "Morphology of Femtosecond Laser Ablated Borosilicate Glass Surfaces", Appl. Phys. Lett. 83 (15), 3030-3032, 2003, pp. 1 to 4.

"Laser Line—Pure Leistung mit Licht", EWAG, www.ewag.com/de/produkte/lasern/laser-line.html, Apr. 30, 2012, two pages.

International Standard ISO 25178-2, Geometrical product specifications (GPS)—Surface texture: Areal—Part 2: Terms, definitions and surface texture parameters, First edition Apr. 1, 2012, reference No. ISO 25178-2:2012(E), Switzerland, pp. iii to 48.

\* cited by examiner

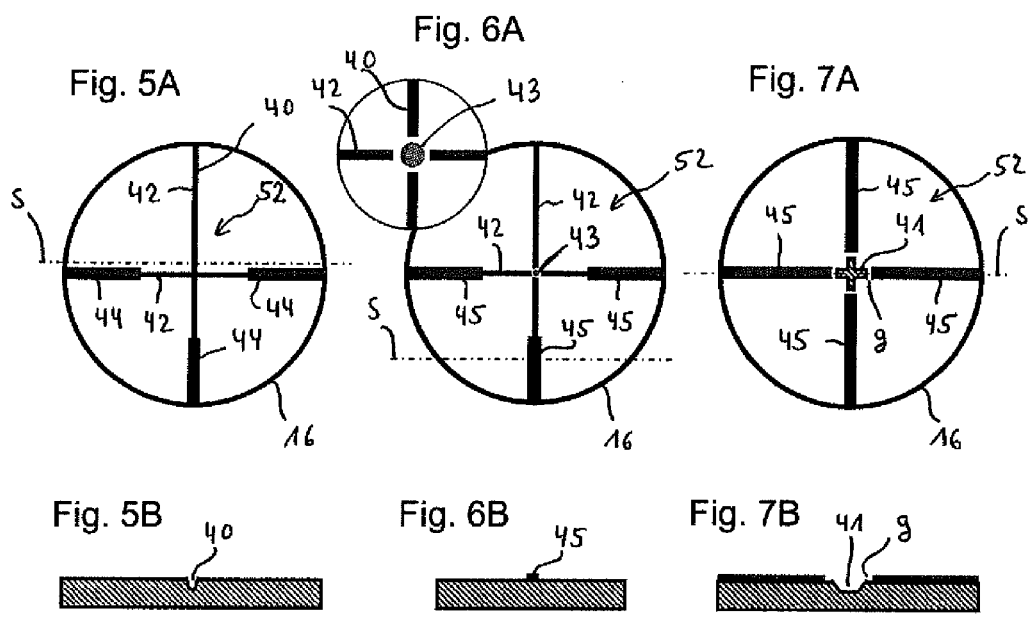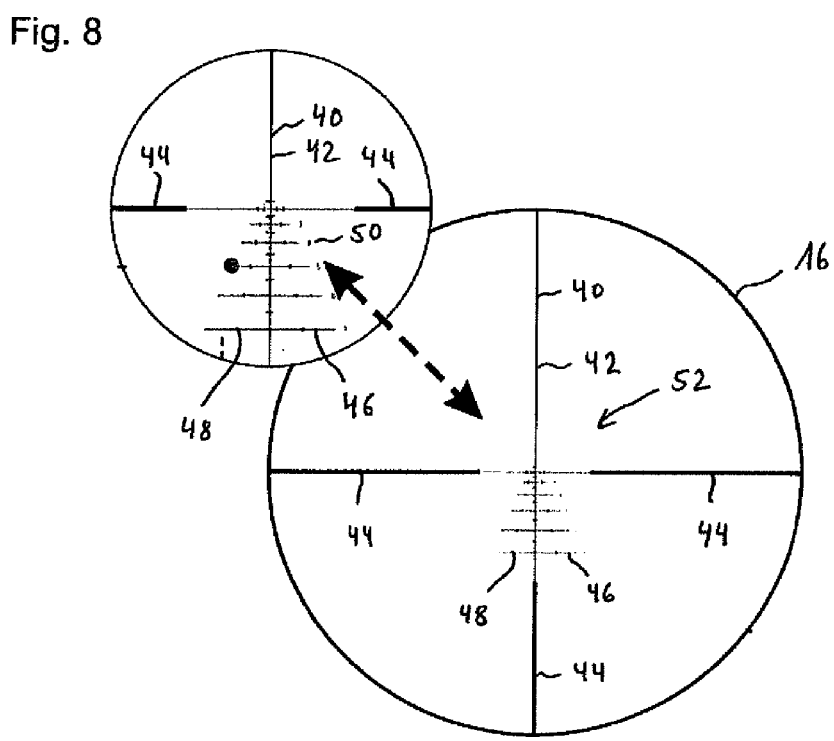

RETICLE FOR A TELESCOPE

CROSS REFERENCE TO RELATED APPLICATION

This application claims priority of U.S. provisional patent application Ser. No. 61/668,756, filed Jul. 6, 2012, the entire content of which is incorporated herein by reference.

FIELD OF THE INVENTION

The invention relates to a reticle with a visible pattern in a transparent substrate for a sighting telescope, in particular a glass reticle, and a method for making such reticle.

BACKGROUND OF THE INVENTION

Reticles are provided in telescopes for sighting of a target, e.g. in a rifle telescope. A typical sighting or rifle telescope 2 is shown in FIGS. 1 and 2 of the drawings. Such telescope 2 typically comprises an optical system which is mounted in a tube 4 having different diameters.

At front portion 4a of the tube 4, which is usually of larger diameter, a front lens system 6 is provided. At an intermediate portion of the tube 4, which is typically referred to as center tube 4b, several adjustable optical elements are positioned. Furthermore, external turrets 8 including a turning knob 10 are positioned at the center tube 4b to adjust the optical properties of the optical system. An ocular or eyepiece 12 is provided at a back portion 4c of the tube 4, which is again typically of larger diameter than the center tube 4b.

The optical system consists of at least the front lens system 6, an erector system 14, and a reticle 16. The optical system defines an optical axis A. The front lens system 6 can consist of a plurality of single lenses or cemented elements (so-called "Kittglieder").

To focus an object 18 to be viewed through the sighting telescope 2 or for adaptation of an ametropie (refractive error) of the user's eye 20, the ocular 12 or a group of lenses being part of the front lens system 6, is axially movable. Such group of lenses may be positioned between the front lens and the erector system 14 and is sometimes referred to as focusing lens.

The front lens system 6 typically produces a real image, which is upside down relative to the viewed object, in a —with regard to the object—conjugated first focal plane F1. The axial position of the first focal plane F1 depends on the distance of the object 18 and can be influenced by the focusing lens.

The erector system 14 includes a fixed group of lenses or includes at least two axially movable zoom elements (14a, 14b) to erect the image. The upside down image is erected by the erector system 14 and is reproduced in another focal plane, namely the second focal plane F2 with a certain reproduction scale. Between the first and the second focal plane (F1, F2) further lens groups like a field lens 22 or Barlow lens may be positioned. All described optical elements may be provided with fittings.

An aperture and a reticle 16 can be provided near the first focal plane F1 conjugated to an infinitely distant object. Typically etched glass reticles or metal reticles are used.

If the erector system 14 includes at least two axially movable zoom elements (14a, 14b), those provide a double function, namely to erect and reproduce the image of the first focal plane F1 in the second focal plane F2 and to allow continuously adjusting the magnification of the image perceived by the user within a mechanically limited range. The reproduction scale of the erector system 14 varies continuously between the first and the second focal plane conjugated to the first focal plane F1.

An aperture and the reticle 16 may also be provided near the second focal plane F2, again typically an etched glass reticle or a metal reticle.

The reticle 16 defines a sighting line which is brought in line with the target object 18. The user can shift the sighting line with the turrets 8 to adjust the point of impact. E.g. ballistic drop of the projectile or lateral offset caused by wind can be compensated. Furthermore, the user can use the focusing lens to obtain a parallax-free image (i.e. the sighting point does not move relative to the object, when the user's eye 20 laterally moves) which is as sharply focused as the reticle 16 independently of the distance of the object 18 even when using a sighting telescope 2 having a large magnification scale.

A zoom position typically means a user-defined magnification adjustment within the mechanically possible adjustment interval of the magnification range of the sighting telescope 2.

A zoom factor is the ratio of two magnifications wherein the larger magnification is put in the numerator. A maximum zoom factor is the ratio of the mechanically possible maximum and minimum magnification of the sighting telescope 2 wherein the larger magnification is put in a numerator.

The ocular 12 is used to reproduce the image of the second focal plane F2 in an arbitrary distance, e.g. at infinite distance or in a virtual distance of one meter, or to focus on the reticle 16.

A ray direction can be defined by the order: object 18, front lens system 6, erector system 14, ocular 12, eye 20.

The fittings of the optical elements or the aperture near the second focal plane F2 limit the subjectively perceived visual field, depending on the adjusted magnification.

If the user zooms from the mechanically maximum possible magnification to the mechanically minimum possible magnification this can change the limitation of the visual field from the aperture near the second focal plane F2 to a fitting of another optical element in front of the second focal plane F2, thereby reducing the visual field. This effect is called "tunneling effect".

The aperture can be defined either by a separate aperture stop or by the fitting of an optical element, which may be different fittings depending on the adjustment of the magnification. The aperture can be reproduced in a plane which is downstream of the ocular—typically at a distance of 70 mm to 100 mm to the ocular—by the remaining optical system. This plane is called "plane of the exit pupil".

The portion downstream of the ocular 12 in which the eye 20 of the user is positioned to view the whole visual field is called "eye box".

An ametropie of the user's eye 20 can be adjusted by a diopter compensation. For this, the axial position of the ocular 12 can be adjusted.

The sighting telescope 2 may comprise further optical components e.g. an illumination of the reticle, a coupling system for coupling in or out of light rays, e.g. for distance measurement or photography. Furthermore, electronic components, sensors, actuators or batteries may be included.

Typically glass reticles are wet etched which is a complex production process requiring many working steps and high manpower. Furthermore, such production process needs substantial infrastructure and space requirements and is harmful to the environment because of the chemistry used. Furthermore, such production process is inflexible because of the lithographic process used. A lithographic process typically includes producing of a mask original, replications of the original etc., so that it takes typically six weeks from design to the production of the first piece. The high fix costs of such process are further disadvantageous, so that it is hard to react when production numbers shift between different reticles.

If a wet etched glass reticle shall be illuminated, the etched structures are typically filled with a light scattering filling material like a titanium oxide containing lacquer or the like.

However, these production processes for illuminated glass reticles are cumbersome and expensive. Furthermore, the brightness and precision of an etched and titanium oxide filled structure to be illuminated may be subject to further improvement.

SUMMARY OF THE INVENTION

It is an object of the present invention to provide a cost-efficient and precise reticle for a sighting telescope, e.g. a rifle telescope.

It is a further aspect of the object of the present invention to provide a reticle for a sighting telescope which can be used in transmission mode and in illuminated mode with high contrast of the sighting pattern.

It is a further aspect of the object of the present invention to provide a flexible and cost-efficient method to produce a reticle for a sighting telescope having a sighting pattern of high precision, which specifically allows to customize the sighting pattern of the reticle from reticle to reticle according to customer wishes (built-to-order).

It is a further aspect of the object of the present invention to provide a method for making a reticle which is not harmful to the environment.

According to the invention a reticle for a sighting telescope, e.g. a rifle telescope is provided. The reticle is based on a transparent substrate in which a visible pattern, e.g. crosshairs, for sighting of a target is provided to be mounted near the first or second focal plane of the telescope. Preferably the transparent substrate is a glass substrate, more preferably consisting of crown glass, e.g. Schott® high transparent crown glass B270 or Schott® bor-crown glass BK7. However, depending on the requirements it might also be possible to use transparent plastics, e.g. polycarbonate as reticle substrate.

The sighting pattern is made of open grooves, i.e. grooves which are open to the surface of the substrate, e.g. essentially having a trapezoidal or about V-shaped cross section. The open grooves are engraved in the front or back surface of the transparent substrate, wherein the engraved open grooves define sidewall or lateral groove surfaces which extend from a bottom of the engraved open grooves to the substrate surface at an angle to the substrate surface in which the open grooves are engraved.

The groove surfaces have a surface roughness which is large enough to scatter light directed onto the reticle perpendicular to the substrate surface when the reticle is illuminated in transmission mode, such that the pattern becomes visible relative to the remaining flat (not engraved) substrate surface by said light scattering at the groove surfaces in the transmission mode when viewed from a direction perpendicular to the substrate surface. In transmission mode the opaque engraved open grooves appear gray, while the remaining or surrounding flat (not engraved) area of the substrate surface is clear and bright and allows to pass an image of the target to the user's eye.

The grooves are visible in transmission mode by the specific opaqueness of the engraved grooves directly caused by the surface roughness of the groove surfaces. Thus, advantageously it is not necessary to fill the engraved grooves with an intransparent filling material to produce the light scattering of the sighting pattern, e.g. of the crosshairs or the like.

Furthermore, the reticle according to the invention is illuminatable. For illumination of the reticle light is coupled into the substrate from an edge of the substrate, e.g. electrically powered illumination by LEDs, OLEDs, quantum points at the side of the reticle in the telescope or by optical fibers. The thin transparent substrate generally acts as a waveguide for visible light, as the electrically powered illumination light coupled in from an edge is guided between the front and back surface of the transparent substrate.

The surface roughness of the sidewall or lateral surfaces of the engraved open grooves has a double effect, namely not only visualizing the sighting pattern by light scattering in transmission mode, but also coupling out light guided within the substrate in an illuminated mode. In the illuminated mode the electrically powered illumination light guided between the substrate surfaces is scattered at the lateral surfaces of the engraved open grooves, wherein the surface roughness causes a visible portion of the electrically powered illumination light to be coupled out in a direction to the ocular, such that the sighting pattern of the reticle is illuminated when viewing it from a direction perpendicular to the substrate surface, i.e. the normal viewing direction of the user through the ocular of the telescope. In other words the sighting pattern appears bright relative to the not engraved remaining flat surface and typically polished surface of the transparent substrate and again without the necessity to fill the open grooves with a light scattering filling material like titanium oxide containing lacquer or the like. Thus, the invention provides an illuminated reticle consisting of a substrate with engraved open grooves forming the sighting pattern. Depending on the ambient light and the power of the reticle illumination it might even be possible that the illumination of the sighting pattern is daylight capable. For this a luminance of about 1000 cd/m² seems to be desirable.

The inventors have found that a minimum threshold value for the surface roughness is advantageous for achieving enough visible light to be scattered both in transmission mode and in illuminated mode. The surface roughness can be defined by the parameter root mean square height of the scale-limited surface $S_q$ according to ISO 25178-2. The root mean square height of the scale-limited surface $S_q$ is defined over the definition area (A) according to ISO 25178-2, first edition, 2012-04-01 as follows:

$$S_q = \sqrt{\frac{1}{A}\iint_A z^2(x, y)\, dx\, dy}$$

For further details it is referred to ISO 25178 which is incorporated by reference herewith.

The surface roughness defined by the parameter root mean square height of the scale-limited surface $S_q$ is preferably chosen to be larger than or equal to 10 nm. Preferably the so defined surface roughness $S_q$ is chosen within an interval of 10 to 1000 nm, more preferably within an interval of 25 to 1000 nm, and most preferably within an interval of 50 to 1000 nm. The definition area A can be about A=2600 µm². As an example, the definition area is defined by a rectangular area of about 153 µm×17 µm.

The inventors have furthermore found that the engraved open grooves in the surface of the transparent substrate having a width FWHM between 1 µm to 8 µm can be produced, resulting in a sharp and precise sighting pattern when viewed through the optics of the telescope even when using the reticle in the first focal plane at the largest magnification of the sighting telescope.

Moreover, it is preferred to provide the engraved open grooves in the surface of the transparent substrate preferably having a depth between 5 μm and 20 μm providing sufficient light scattering to visualize the sighting pattern in combination with the preferred width. The depth is measured from the substrate surface to the bottom of the engraved open grooves, while the width is measured as FWHM value between the substrate surface and the groove bottom.

Preferably the engraved open grooves have an aspect ratio, defined as the width FWHM divided by the depth, of smaller than or equal to 2, which advantageously provides high sharpness of the pattern in combination with a good brightness also in illuminated mode.

Preferably the engraved open grooves form horizontal and/or vertical lines, e.g. to form crosshairs. Further preferably the grooves have a substantially trapezoidal cross section defined by a bottom and left and right sidewall or lateral groove surfaces. The lateral surfaces of the grooves have a slope angle to the substrate surface in an interval of 40° to 80°, preferably of 50° to 80°. This provides good visibility of the pattern in transmission and illuminated mode. Preferably, the surface roughness $S_q$ of the lateral and bottom surfaces of the engraved open grooves is substantially equal. Further preferably, the surface roughness $S_q$ of the groove surfaces of the horizontal and vertical lines are in the above-defined intervals of the parameter $S_q$ and/or are substantially equal.

According to a preferred embodiment of the invention the reticle includes, in addition to the crosshairs of thin horizontal and vertical lines one or more engraved open beams in the substrate surface in a peripheral portion radially distal from the center of the crosshairs and collinear with the lines of the crosshairs, wherein the engraved open beams have a larger width than the engraved open grooves of the crosshairs in the central portion. Sometimes such reticle is called a duplex-reticle. Preferably the surface roughness of the groove surfaces of the crosshairs and the engraved open beams is substantially equal.

Furthermore, the reticle can be in the form of a ballistic reticle having a plurality of engraved open alignment lines, in particular horizontal, engraved open alignment lines and/or a plurality of engraved open alignment dots and wherein the surface roughness of the engraved open grooves of the crosshairs and the engraved open alignment lines and/or the engraved open alignment dots are in the above-defined intervals of the parameter $S_q$ and/or are substantially equal.

According to a preferred embodiment the reticle includes at least one intransparent deposited structure on the substrate surface, in particular one or more bars of deposited metal (e.g. a deposited structured chromium coating) on the substrate surface. Specifically, bars of deposited metal, which are positioned on the substrate surface in a periphery of the crosshairs and collinear to the horizontal and vertical lines of the crosshairs, form a partially illuminated duplex-reticle. Such duplex reticle has an inner part defined by the engraved open grooves forming the crosshairs which are opaque and illuminated while the outer metal bars deposited on the substrate surface in the periphery of the crosshairs are intransparent. Thus, these bars are not illuminated, but have a higher contrast in transmission mode than the light scattering pattern consisting of said engraved open grooves.

Preferably the transparent substrate is a flat plane-parallel substrate, but alternatively it might be in the form of a convex lens, in particular a plano convex lens.

According to a preferred embodiment the transparent substrate has an anti-reflex-coating which is interrupted by the engraved open grooves. Thus, advantageously the coating is provided on the substrate before the grooves are engraved.

The reticle according to the invention having such visible pattern in a transparent substrate to be used in a sighting or rifle telescope for sighting of a target can be produced by a method comprising the following steps:
  a) providing a scanning laser system adapted to produce a pulsed focused laser beam. Such laser system can e.g. be a LUMERA Rapid laser (see http://www.lumera-laser.com/rapid.html), integrated in a microSTRUCT vario machine (see http://3d-micromac.com/microstruct-vario-en.html).
  b) The transparent substrate is mounted in said laser system.
  c) The open grooves are directly engraved in the surface of the transparent substrate by said pulsed focused laser beam thereby forming the visible pattern. Sometimes such process of laser engraving a structure in a surface is called laser direct writing. A scanning method is used, wherein either the pulsed focused laser beam is scanned over the substrate surface, e.g. by a pivotable scanning mirror or the substrate is moved under the pulsed focused laser beam to provide the laser direct writing of the sighting pattern of the reticle. Thereby the open grooves are created and groove surfaces, preferably including a groove bottom surface and sidewall or lateral groove surfaces at an angle to the substrate surface are exposed. Advantageously, engraving open grooves by such laser system is cost-efficient, provides a precise sighting pattern and allows to customize the sighting pattern of the reticle from reticle to reticle according to customer wishes (built-to-order).

In particular, the settings of the pulsed focused laser beam are chosen so that the substrate material at the surface is removed by laser direct writing in the regime of cold laser ablation. For this, the pulse duration of the laser pulses is shorter than the thermal process in the substrate material and/or the pulse power in the focus of the laser beam is set to be large enough to effect a multiphoton-interaction in the transparent substrate material, which effectively causes cold ablation of the substrate material at the substrate surface thereby ablating substrate material at the substrate surface to engrave the open grooves with the desired surface roughness.

By cold ablation, in particular in glass, said open grooves can be created with the desired minimum surface roughness without damaging the substrate material by creating undesired cracks or the like. This minimum surface roughness of the so exposed surfaces is large enough to scatter light directed onto the reticle perpendicular to the substrate surface when the reticle is illuminated in transmission mode, such that the pattern becomes visible relative to the remaining not engraved substrate surface by light scattering at the rough groove surfaces in transmission mode when viewed by the user from a direction perpendicular to the substrate surface through the ocular of the telescope.

Furthermore, the surface roughness is adapted to couple out electrically powered illumination light which is at an edge coupled into the thin transparent substrate acting as waveguide for visible light and guiding the electrically powered illumination light to the engraved open grooves, thus forming an illuminatable reticle.

The quality of the sighting pattern so produced is comparable with those produced by the previous methods, but the method according to the invention has the following advantages:

Substantial reduction in complexity of the process chain, because no lithographic process is necessary. Therefore, no masks and no wet etching chemistry are necessary.

A new business model for the production of reticles is available, namely built-to-order reticles and customization of reticles.

A multiple design iteration is possible, because adaptations of the product are achieved by simple change of programming of the movement of the laser beam or movement of the substrate under a fixed laser.

Furthermore, the laser production method according to the invention has a large universality in processing different materials. Therewith, the capacity utilization of the laser process is given with the aforementioned reticles, even if changes in the production numbers between different reticles will occur.

According to the previous technology, structures which are appearing dark in the image area were established by a lithographic process followed by deposition of chromium. With the laser process according to the invention, scattering of light is provided at the sidewall surfaces of the grooves produced by the laser beam which results in a reduction of transmission. In specific embodiments the homogeneity of the transmission reduction for widths>100 μm, e.g. peripheral engraved open beams, can be optimized by tuning of the groove profile with the laser.

Structures which are to be illuminated in the image area were previously produced by a chemical deep etching process in glass and afterwards the structures were filled with a white lacquer.

Producing the engraved open grooves having surface edge structures with sufficient surface roughness with the pulsed focused laser beam advantageously provides a much improved illumination efficiency, due to stronger scattering of the incoupled electrically powered illumination light mainly at the lateral surfaces of the so laser-engraved open grooves.

According to the invention a high quality of the structuring of the engraved sighting pattern is achieved, namely a sufficient edge quality for the application at hand, easy removable debris, customization far downstream of the manufacturing chain, universality in processing different materials, dimensioning of structure widths down to 10 μm and less.

Furthermore, it is possible to vary brightness and contrast of the sighting pattern as long as they are above a lower threshold.

The $1/e^2$-diameter $d_{spot}$ of the focus spot of the laser beam having a typical Gaussian beam profile depends on:

the focal length f of the optical system,
the $1/e^2$-diameter D of the laser beam at the exit of the optical system,
the wavelength λ of the laser light, and
a quality factor $M^2$ of the laser, which is e.g. 1.1, but is not considered here.

According to the following exemplary calculation
f=80 mm
λ=1064 nm/2=532 nm and λ'=1064 nm/3=355 nm
D=20 mm,
the $1/e^2$-diameter $d_{spot}$ of the focus spot of the laser beam is according to equation d=4*λ*f/(π*D):
$d_{spot}$=2.7 μm at λ=532 nm and
$d_{spot}$'=1.8 μm at λ'=355 nm.

Preferably, the laser system is operated to generate a pulsed focused laser beam with one or more or all of the following parameters:

the pulse energy of the pulsed focused laser beam in the focus is 0.5 μJoule to 8 μJoule, finding a compromise between processing time and ablation accuracy, the power of the laser pulse in the focus of the pulsed focused laser beam is at least 0.025 μJ/ps, the laser has a wavelength of 355 nm to 532 nm, maybe even 320 nm to 532 nm which can e.g. be achieved by frequency doubling or tripling of a YAG-laser having a wavelength of 1064 nm (it is assumed that smaller is better, therefore using an UV-laser is preferred), the pulsed focused laser beam has a pulse length of ≤20 ps, preferably ≤10 ps, (it is assumed that shorter is better)

the FWHM diameter of the pulsed focused laser beam in the focus ($1/e^2$ spot size) is ≤10 μm, preferably ≤6 μm, for very narrow grooves more preferably ≤1 μm, the focal length of the pulsed focused laser beam is ≤100 mm, preferably ≤50 mm (it is assumed that smaller is better), the pulsed focused laser beam is scanned over the substrate surface with a laser spot spacing along the scan direction of <3 μm, the pulsed focused laser beam is scanned over the substrate surface with a laser spot spacing transversal to the scan direction of <10 μm.

The spatial separation of the pulse spots along the scan direction is about 0.4 μm (more generally between 0.2 μm and 3 μm), that is a scan velocity of 22 mm/s at a pulse rate of 50 kHz.

The number of parallel scan lines depends on the desired groove width and might just be one when engraving narrow open grooves like e.g. the central portion of crosshairs. However, if broader open grooves are engraved, parallel scans can be made. The spatial separation of the pulse spots transversal to scan direction can be 5 μm (preferably between 1 μm and 10 μm).

Scanning the same line only once with the pulsed focused laser beam with these parameters can be sufficient when using a glass substrate, i.e. the number of laser pulses at exactly the same transparent substrate position is only one. However, multiple scanning shall not be excluded.

Advantageously, engraving open grooves with these parameters provides a precise sighting pattern and achieves the desired dimensions and surface properties of the engraved open grooves, in particular the desired surface roughness of the groove surfaces providing sufficient light scattering in transmission and illuminated mode for sighting of a target in differing ambient light situations.

Preferably, a reticle can be provided wherein the center of the crosshairs has a distance from the principal axis of the telescope of smaller than 10 μm.

Preferably, the open grooves are engraved with the pulsed focused laser beam with one or more or all of the following parameters:

the open grooves are engraved in the surface of the transparent substrate with a depth between 5 μm and 20 μm by one or more scans with the pulsed focused laser beam, the open grooves are engraved in the surface of the transparent substrate with a width FWHM between 1 μm to 8 μm, the open grooves are engraved in the surface of the transparent substrate with an aspect ratio, defined as width FWHM divided by depth, of smaller than or equal to 2, the open grooves are engraved in the surface of the transparent substrate forming horizontal and/or vertical lines and having a substantially trapezoidal or V-shaped cross section with a slope angle of the sidewall or lateral groove surfaces to the substrate surface of between 40° and 80°, more preferably between 50° and 80°.

Advantageously, even complicated structures of open grooves can be engraved with a pulsed focused laser beam in a single working step by scanning the substrate surface.

As an exemplary structure crosshairs consisting of horizontal and vertical lines are engraved in the substrate surface efficiently in the same working step (without removing the substrate from the laser system).

A further exemplary structure includes at least one engraved open beam in the substrate surface in a peripheral portion radially distal from the center of the crosshairs, wherein the at least one open beam is engraved with a larger width than the engraved open grooves of the crosshairs in the center in the same working step (without removing the substrate from the laser system).

A further exemplary embodiment includes open grooves in the substrate surface including alignment lines and/or alignment dots, which are engraved in the same working step (without removing the substrate from the laser system).

In a preferred embodiment a transparent substrate is used having a deposited metal coating on the substrate surface. The deposited metal coating is partially removed to form a structured metal coating on the substrate surface with the laser system. More specifically the structured removal of the deposited metal coating (e.g. by evaporation or sublimation) and the engraving of the open grooves (by cold ablation) is effected by the same laser system with different laser settings of the laser beam, preferably without removing the substrate from the laser system. The different setting may include, but is not limited to, different laser beam power, different laser beam focus, and/or different pulse length of the laser beam.

Advantageously, the substrate surface is not injured by the laser engraving method, so that the transparent substrate may be polished and/or coated, e.g. with an antireflex coating before it is mounted in the laser system and engraved by the pulsed focused laser beam, so that the open grooves are engraved with the pulsed focused laser beam in the surface of the already polished and/or already coated substrate, which is very efficient and still provides a good surface finish of the reticle.

Preferably, the transparent substrate is cleaned in a supersonic bath after engraving the open grooves with the pulsed focused laser beam to clean the open grooves in the surface of the transparent substrate from the debris which is created by the laser ablation.

The morphology of femtosecond laser ablated borosilicate glass surfaces is also generally discussed by Ben-Yakar et al. in "Morphology of Femtosecond Laser Ablated Borosilicate Glass Surfaces", Appl. Phys. Lett. 83(15), 3030-3032, 2003.

The invention is described in more detail and in view of preferred embodiments hereinafter. Reference is made to the attached drawings wherein same and similar elements are denoted with the same reference signs.

BRIEF DESCRIPTION OF THE DRAWINGS

The invention will now be described with reference to the drawings wherein:

FIG. 5A is a reticle with crosshairs and peripheral engraved open beams;

FIG. 5B is a schematic cross section through the dash/dotted line in FIG. 5A;

FIG. 6A is a reticle similar to the reticle in FIG. 5A, but with a separate illuminated sighting dot in the center;

FIG. 6B is a schematic cross section through the dash/dotted line in FIG. 6A;

FIG. 7A is a further reticle with an illuminated sighting cross in the center and peripheral bars of intransparent material;

FIG. 7B is a schematic cross section through the dash/dotted line in FIG. 7A;

FIG. 8 is a ballistic reticle with sighting lines and dots;

DESCRIPTION OF THE PREFERRED EMBODIMENTS OF THE INVENTION

Figure 1:
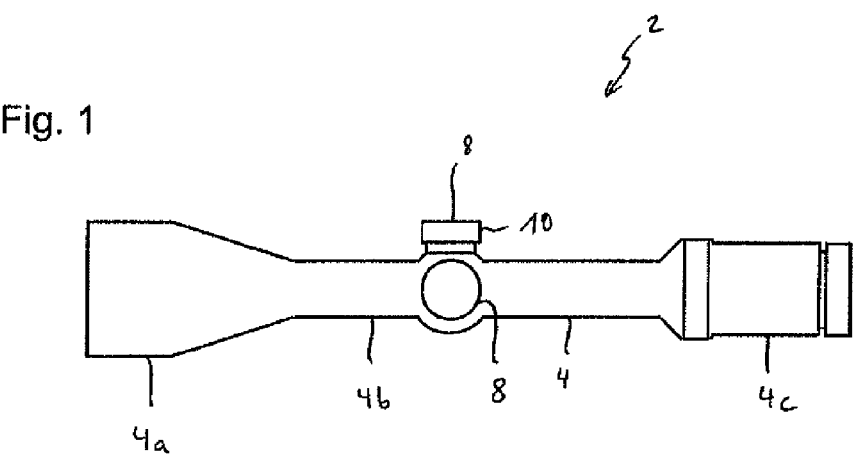
FIG. 1 is a side view on a sighting telescope.
Figure 2:
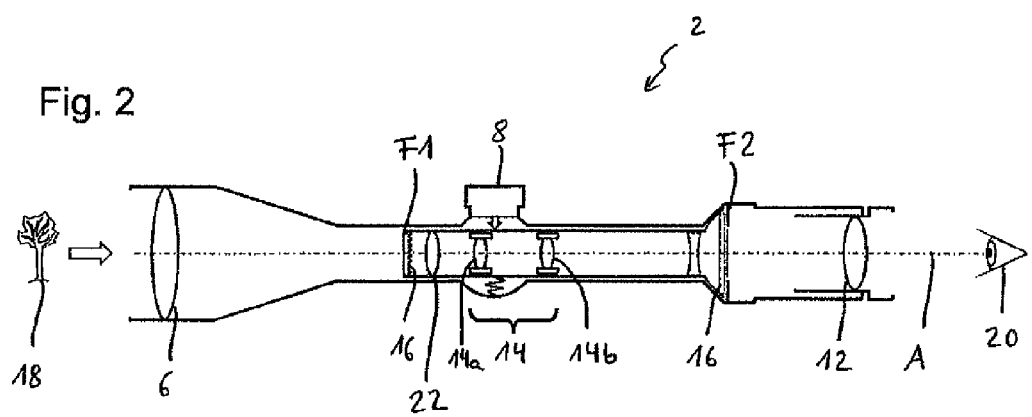
FIG. 2 is a schematic cross section through the sighting telescope of FIG. 1.

FIGS. 1 and 2 show a sighting telescope as already explained in the introductory portion of the specification to which it is referred herewith. The reticles produced according to the present invention are to be used in such a sighting telescope, in particular near the first or second focal plane (F1, F2).

Figure 3:
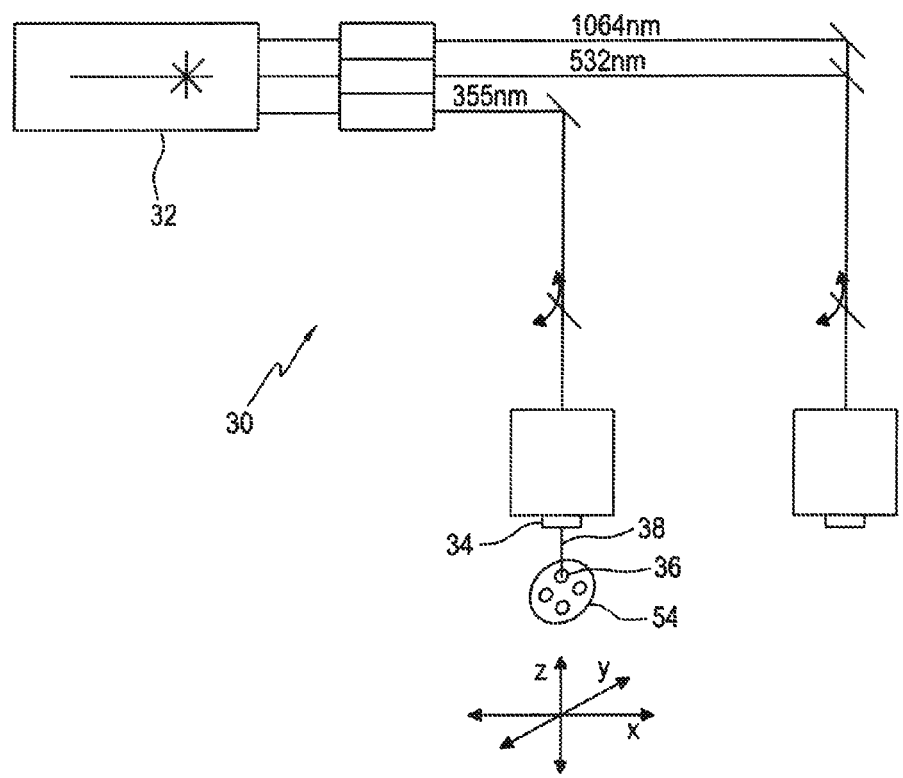
FIG. 3 is a schematic drawing of a laser system for engraving a sighting pattern in a transparent substrate.

Referring to FIG. 3, a laser system 30, comprising a UV picosecond LUMERA laser 32, operating at 250 mW, 355 nm, and having a 100 mm F-Theta optics 34 is used to engrave the open grooves in a substrate 36 to produce the reticle 16 with a sighting pattern. The pulsed focused laser beam 38 is scanned in x-and-y-direction over the substrate 36 mounted on a mounting plate 54 of the laser system 30.

Figure 4:
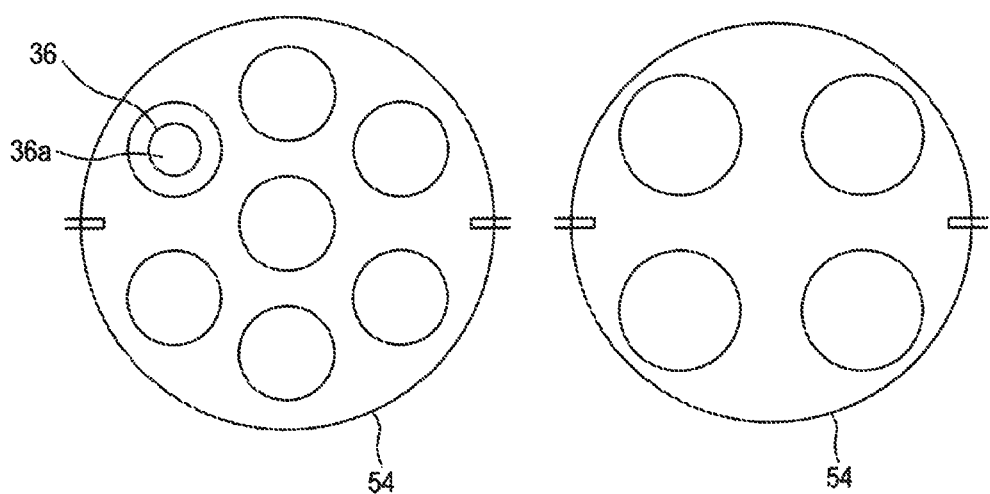
FIG. 4 is a mounting plate of a laser system.

Referring to FIG. 4, seven or four substrates 36 can be mounted in the mounting plate 54 of the laser system 30. The glass substrates 36 can be uncoated or can already be coated when mounting in the laser system 30 for laser engraving. In this example, planar both sided polished glass substrates of a diameter of 24 mm (or smaller), having a thickness of 1 to 2 mm+/−100 μm and consisting of Schott® glass BK7 or B270 have been used. Alternatively, plano convex lenses can be used as glass substrates 36 polished on both sides and also having a diameter of 24 mm (or smaller), made of Schott® BK7 or B270, also being coated or uncoated. It is a specific advantage of the present invention that also non planar substrates, e.g. plano convex substrates can be engraved, avoiding bonded optics as used with mask-based etching processes.

Afterwards, the desired geometries of open grooves are engraved by the pulsed focused laser beam 38 in the coated or uncoated substrate front surface 36a. A groove width (w) (FWHM) of <10 μm, preferably 1 μm to 8 μm, is produced.

These engraved open grooves appear bright under edge illumination and remain darker/gray without edge illumination (see e.g. FIGS. 9 to 11 and 15 to 16). The depth profile is optimized away from a rectangular groove (where the groove edges would appear darker than the center) towards a groove cross section that generates a more uniform shading level for broader lines. The open grooves 40 may be engraved with a trapezoidal cross section, having angled sidewall surfaces and a bottom of finite width (see FIG . 12 to 16).

After laser engraving the sighting pattern 52 the reticle is cleaned in an ultrasonic cleaning bath (not shown) with water to remove the generated debris. Laser engraving with the preferred settings should not induce coating or surface cracks, so that the substrate 36 can be polished before the laser engraving step and no additional polishing after that seems necessary. Furthermore, even the coating, e.g. an anti-reflex coating can be provided on the substrate surface 36a before the laser engraving step. In other words, the already polished and/or coated substrate 36 is laser-engraved and is directly ready to use after cleaning.

The processing time depends on the process parameters and can be in the range of 2 min per reticle.

Herewith, the reticle 16, consisting of the substrate 36 with an engraved user-specified reticle structure, defining the sighting pattern 52, is produced, emitting light perpendicular to the substrate surface 36a, when being illuminated from an edge 36c of the reticle substrate 36.

Referring to FIGS. 5A to 8, an exemplary variety of different sighting patterns (without limitation) is shown which can be produced according to the invention.

FIG. 5A shows an exemplary embodiment of a reticle 16 having a sighting pattern 52 consisting of crosshairs 42 and left, right and bottom peripheral beams 44 being co-linear with the respective lines of crosshairs 42. Crosshairs 42 and beams 44 are laser-engraved, thus forming engraved open grooves 40 which can be illuminated. FIG. 5B shows a schematic cross section along the dashed/dotted line S in FIG. 5A, representing a cross section through the engraved open groove 40 of the vertical line of crosshairs 42.

FIG. 6A shows a further exemplary embodiment of a reticle 16 with engraved crosshairs 42 having a separated laser engraved dot 43 at the center. Bars 45 in this embodiment are not laser-engraved grooves, but bars of a chromium coating, thus forming intransparent bars 45, appearing dark under all circumstances. Chromium bars 45 can be produced with the same laser system 30 in a single manufacturing process as follows: Substrate 36 is provided with a deposited chromium coating on substrate surface 36a before mounting the substrate 36 in the laser system 30. With the afore-mentioned laser settings, the open grooves 40 are engraved in the chromium coated surface 36a of the glass substrate 36. In the same manufacturing process (without removing the substrate 36 from the mounting plate 54 of laser system 30), the chromium coating is structured with a different laser setting by evaporating parts of the chromium coating off the substrate surface 36a. Therewith, high relative precision between the chromium bars 45 and the engraved open grooves 40 can be achieved.

FIG. 7A shows a further exemplary embodiment of reticle 16 with four peripheral chromium bars 45 and an illuminatable engraved open groove structure in the form of a central cross 41.

If such a reticle 16 would be commonly produced with wet-etching processes, two masks and two etching processes would be required. Therefore, with common production methods it is difficult to achieve precise alignment between the peripheral bars 45 and the illuminatable engraved open groove structure 41. According to the present invention, both structures (41, 45) of the sighting pattern 52, can be produced without removing the substrate 36 from the mounting plate 54 in laser system 30. Therewith, a high precision for the relative alignment between structures 41 and 45 can be achieved. In particular, gap (g) between the bars 45 and the engraved open grooves—here exemplary in the form of an illuminatable sighting cross 41—can be made small.

Referring to FIG. 8, a more complicated ballistic reticle 16 is shown, having a sighting pattern 52 consisting of engraved open grooves 40, defining crosshairs 42, peripheral engraved open beams 44, ballistic lines 46, lateral alignment dots 48 and numbers 50.

Figure 9:
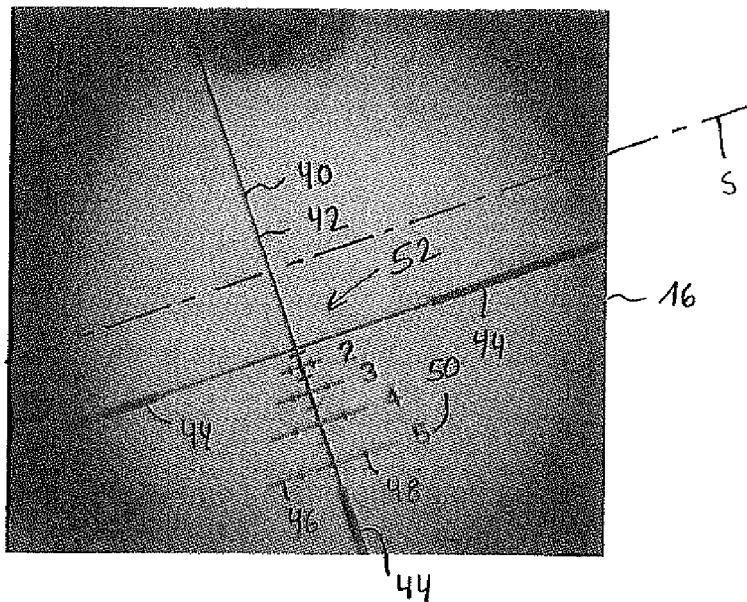
FIG. 9 is a photo of an illuminatable ballistic reticle produced according to the present invention.
Figure 10:
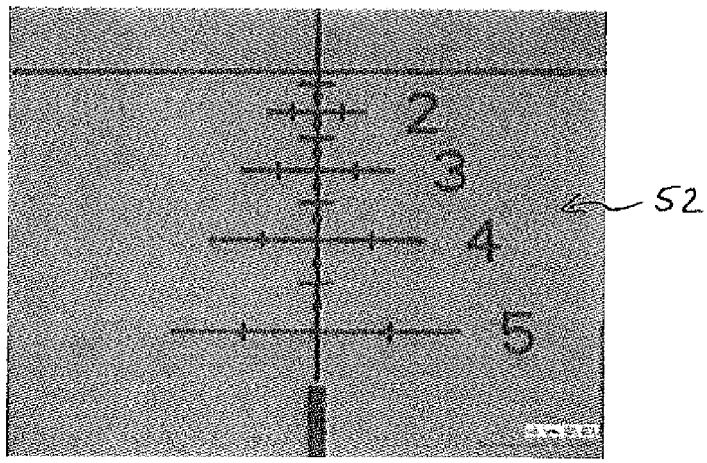
FIG. 10 is an enlarged photographic representation of the ballistic lines of the reticle in FIG. 9.
Figure 11:
FIG. 11 is a photo similar to FIG. 9, with the ballistic sighting pattern being illuminated.

An exemplary embodiment of a ballistic reticle 16 as shown in FIG. 8 has been produced according to the present invention, which is shown in the photos of FIGS. 9 to 11. The open grooves 40 of the reticle 16 are laser engraved according to the present invention forming crosshairs 42, peripheral engraved open beams 44 of larger width than the crosshairs 42 and ballistic lines 46 with lateral dots 48 and numberings 50. The open grooves 40 are engraved by the laser system 30, operating at a scan speed of 20 mm/s, a line shift of 5 µm in single path mode, at no burst mode, with a pulse length of <10 ps, at a pulse energy of 1.25 µJ and at a repetition rate of 200 kHz and 50 kHz EOM (i.e. every fourth pulse is picked).

FIG. 9 shows a central portion of the exemplary ballistic reticle 16 in transmission mode, where the engraved open grooves 40 appear dark (gray) against the more bright background. FIG. 10 shows a magnification of the central portion of FIG. 9. FIG. 11 shows the same ballistic reticle 16, however, with illuminated sighting pattern 52, consisting of the engraved open grooves 40 which are illuminated by coupling in electrically powered illumination light at an edge (see FIG. 16) of the ballistic reticle 16.

Figure 12:
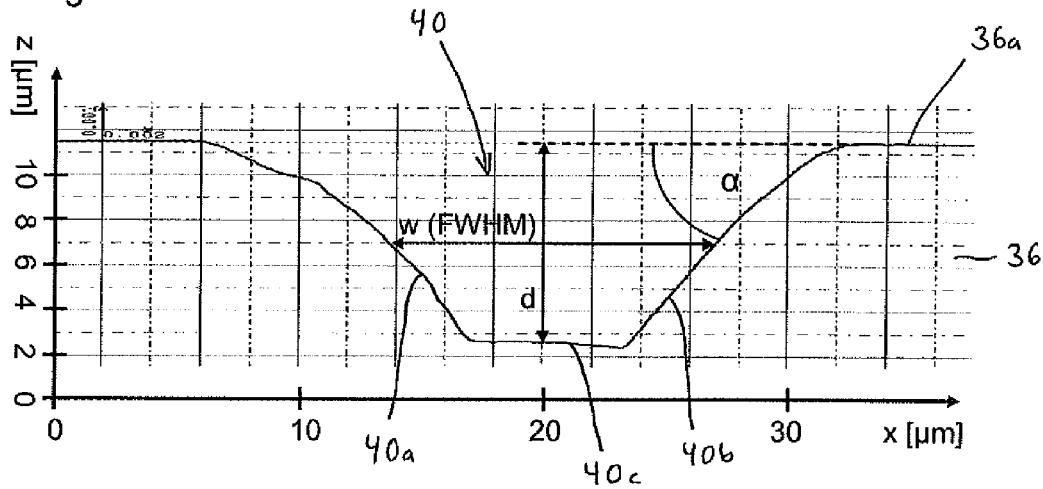
FIG. 12 is a cross sectional profile of the vertical groove of the reticle along the dash/dotted line in FIG. 9.
Figure 13A:
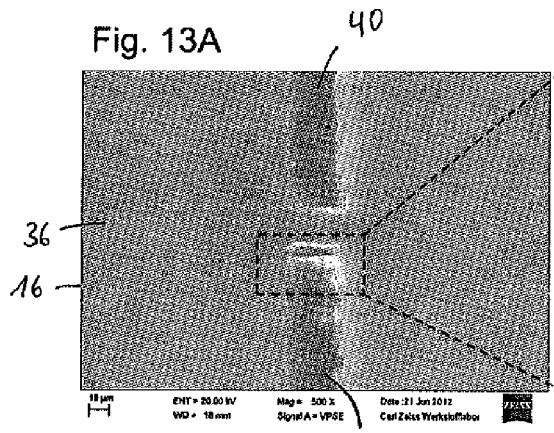
FIG. 13A is a REM-image of an open groove of a sighting pattern of a reticle produced according to the present invention.
Figure 13B:
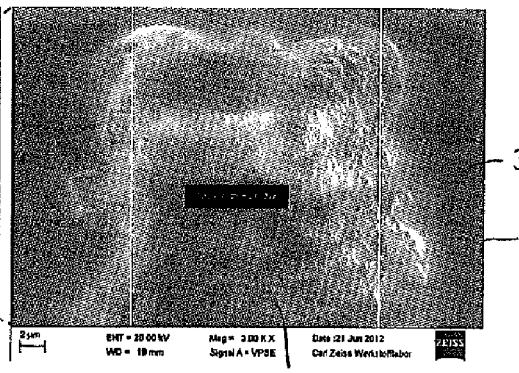
FIG. 13B is a magnification of FIG. 13A.
Figure 14A:
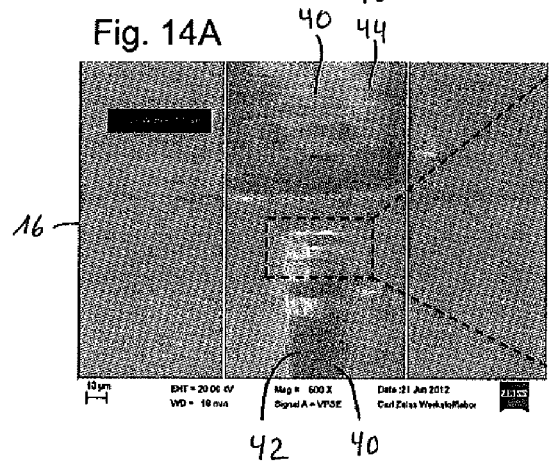
FIG. 14A is a REM-image of another open groove of a sighting pattern of a reticle produced according to the present invention.
Figure 14B:
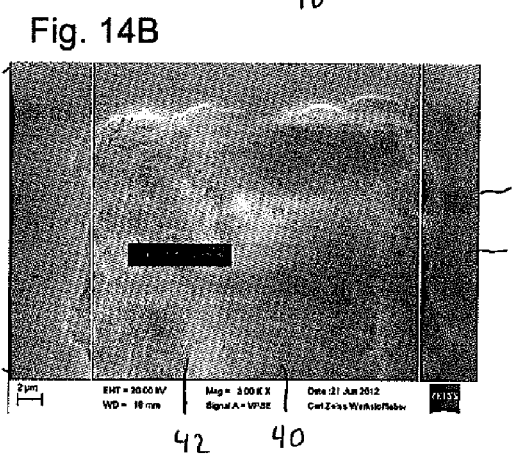
FIG. 14B is a magnification of FIG. 14A.

Referring to FIG. 12, a measured cross section of an open groove 40 of a first prototype of reticle 16 is shown. The engraved open groove 40 is defined by sidewalls having sidewall surfaces (40a, 40b) and bottom having a bottom surface 40c. In this example, sidewall surfaces (40a, 40b) have a slope angle $\alpha$ of about 45° with respect to the substrate surface 36a. Thus, the engraved open grooves 40 essentially have a trapezoidal cross section as may be seen in FIG. 12. The depth (d) of the engraved open groove 40 of this prototype is about 9 µm and the width (w) (FWHM) is about 12 µm. It is noted, that this is only a first prototype for testing and measurement purposes and more narrow open grooves can be produced according to the invention.

FIGS. 13A to 14B show REM images of portions of the engraved open grooves 40. According to the invention, the open grooves 40 are engraved with relatively large surface roughness. When operating the pulsed focused laser beam 38 with the settings as described above, the regime of cold laser ablation is reached. It has turned out, that a suitable surface roughness can be achieved. The surface roughness defined by the root mean square height of the scale-limited surface $S_q$ according to ISO 25178-2 achieved with the exemplary embodiment is at least 10 nm, or particularly in the interval between 10 nm and 1000 nm, measured over a definition area of about A=2600 µm², defined by a length of about 153 µm and a width of about 17 µm of the definition area, whereas size and form definition area may be adapted depending on the groove width. This surface roughness creates scattering of visible light in transmission mode as well as in illuminated mode directly at the groove surfaces. The groove surfaces created by cold laser ablation with the above-defined parameters may also be described having the form of a "cratered landscape" consisting of a dense field of hollows and/or domes having a size in the nanometer regime. The light scattering at the groove surfaces thus includes diffuse light diffraction and/or refraction at the nanosized hollows and/or domes.

The so defined surface roughness $S_q$ in the preferred range of $S_q$=10 nm to 1000 nm is difficult to measure with an interferometer, even at the lower end of the preferred interval. However, the surface roughness can e.g. be measured tactile or with an atomic force microscope (AFM). A technique for determining the root-mean-square roughness is described by Duparré et al., "Surface characterization techniques for determining the root-mean-square roughness and power spectral densities of optical components", Applied Optics, Volume 41 No. 1, Jan. 1, 2002, which is incorporated by reference herewith.

Figure 15:
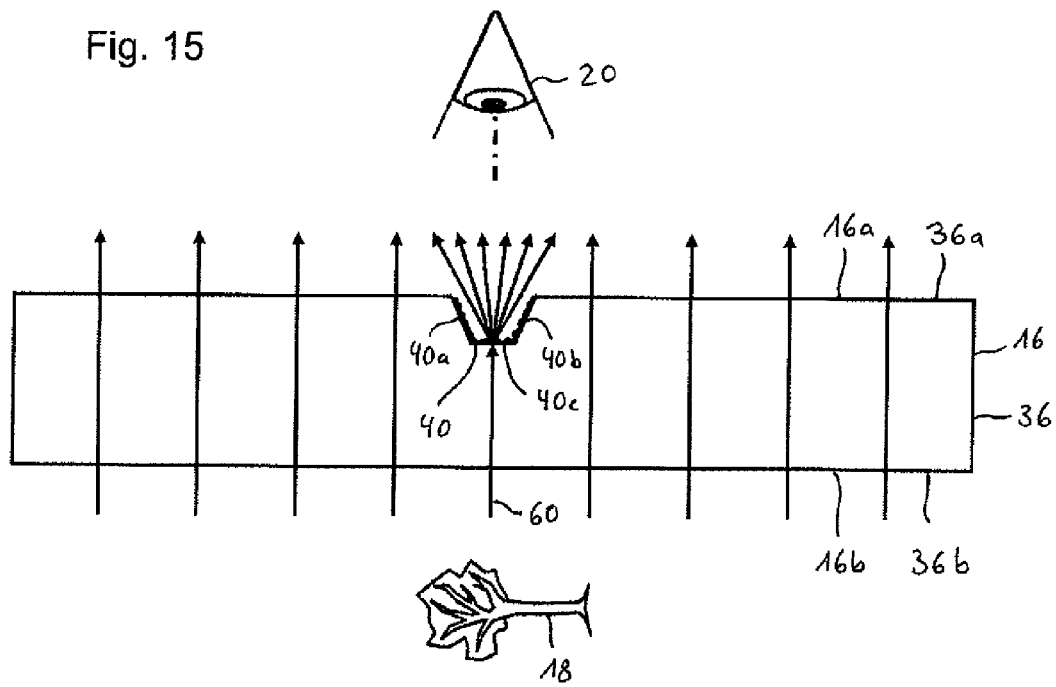
FIG. 15 is a schematic cross section of a reticle in transmission mode.

FIG. 15 schematically shows the effect of the engraved open grooves 40 with such surface roughness in transmission mode. Light 60 transmitting substrate 36 or reticle 16 from the respective backside (36b, 16b) in a perpendicular direction, i.e. natural light entering the telescope 2 through the lens system 6, passes the reticle 16 nearly undisturbed at polished substrate surfaces (36a, 36b). However, at the rough sidewall surfaces (40a, 40b) and the rough bottom surface 40c of the engraved open groove 40 light 60 entering perpendicular to the substrate surface 36b is diffusely scattered, causing a less bright appearance of the groove structure, thus causing the groove structure to be darker than the rest of the polished surface 36a. Therewith, in transmission mode as shown in FIG. 15, the engraved open groove 40 appears darker or gray relative to the surrounding more bright flat surface 36a, without necessity of filling the engraved groove 40 with intransparent filling material, i.e. leaving the engraved groove 40 "open" to the substrate surface 36a.

Figure 16:
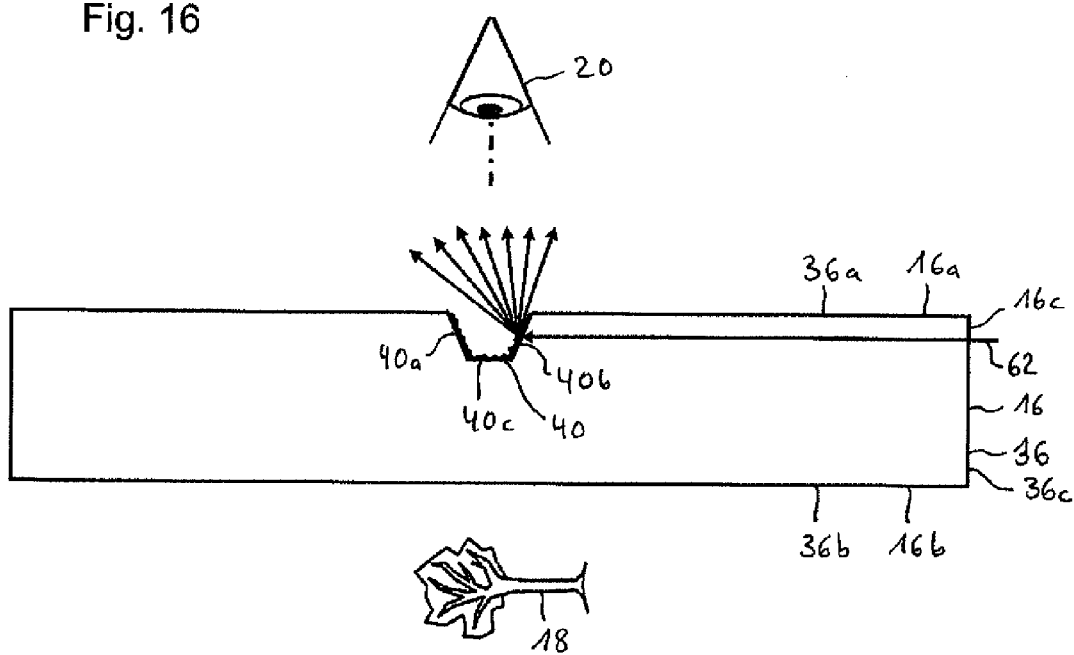
FIG. 16 is a schematic cross section of a reticle in illuminated mode.

Referring to FIG. 16, the surface roughness, particularly of the side surfaces 40a and 40b, provides a second effect when the reticle 16 is illuminated. Reticle 16 is illuminated from substrate edge 36c (or reticle edge 16c), e.g. with one or more LEDs, OLEDs, quantum points or the like (not shown), as is known to the skilled person. Thus, electrically powered illumination light 62, coupled in at edge 36c of substrate 36 is guided within substrate 36 between front and back surfaces (36a, 36b) by total reflection as known for optical waveguides (it is noted, that the schematic representation of FIGS. 15 and 16 is not true to scale). Electrically powered illumination light 62 which reaches the rough surfaces of the engraved open groove 40, mainly the side surfaces (40a, 40b), is coupled out of the substrate material 36, and is emitted in diffuse directions out of the engraved open groove 40. This causes the groove structure appearing bright relative to the remaining polished front surface 36a of reticle substrate 36. Therewith the effect of an illuminated sighting pattern 52 can be achieved without filling the engraved open grooves 40 with special light scattering lacquer, e.g. a titanium oxide lacquer.

It is also possible to laser engrave the open grooves 40 from the back side 36b of the substrate 36. This can have the advantage, that the debris created by cold ablation of the substrate material obtains a momentum away from the substrate 36. When the substrate 36 is engraved from the back side 36b, the substrate material has to be transparent for the pulsed focused laser beam 38, e.g. made of a UV transparent glass.

The larger the depth (d) of the engraved open grooves 40 is, the larger are the illuminatable side surfaces (40a, 40b) of the engraved open grooves 40. Therewith, the brightness of the illuminated engraved open grooves 40 can be adjusted. Thus, engraved open grooves 40 of the same width (w) can be designed to have different brightness by adjusting the depth (d) and slope angle a of the sidewall surfaces (40a, 40b). Therewith, the engraved open grooves 40, having the same width (w) and provided on the same reticle 16 can have different brightness with same illumination at substrate edge 36c.

Summarizing, the surface roughness mainly of the sidewall surfaces (40a, 40b), is important for the brightness in the illuminated mode, while the surface roughness of the bottom surface 40c is mainly important for a high contrast in the transmission mode. Therewith, by adjusting the form of the cross section of the engraved open grooves 40, even brightness gradients along the engraved open grooves 40 can be designed as desired.

It is understood that the foregoing description is that of the preferred embodiments of the invention and that various changes and modifications may be made thereto without departing from the spirit and scope of the invention as defined in the appended claims.

LIST OF REFERENCE NUMBERS 2 sighting or rifle telescope
4 tube
4a front portion of tube 4
4b center tube
4c back portion of tube 4
6 front lens system
8 external turrets
10 turning knob
12 ocular
14a/b axially movable zoom elements
16 reticle
16a reticle surface
16b reticle backside
16c reticle edge
18 object
20 user's eye
22 field lens
30 laser system
32 laser
34 F-Theta optics
36 substrate
36a substrate surface
36b substrate backside
36c substrate edge
38 pulsed focused laser beam
40 engraved open groove
40a/b sidewall or lateral groove surfaces
40c groove bottom surface
41 engraved open sighting cross
42 engraved open crosshairs
43 engraved open dot
44 engraved open beams
45 intransparent bars
46 ballistic lines
48 lateral alignment dots
50 engraved numbers
52 sighting pattern
54 mounting plate
60 natural light entering through the front lens system
62 electrically powered illumination light
A optical axis
F1 first focal plane
F2 second focal plane

What is claimed is:
1. A reticle for a telescope, the reticle comprising:
a visible pattern in a transparent substrate;

wherein the pattern is made of open grooves which are engraved in a surface of the transparent substrate, the engraved open grooves defining groove surfaces; and, wherein the groove surfaces have a surface roughness defined by the parameter $S_q$ according to ISO 25178-2 being larger than or equal to 10 nm to scatter visible light directed onto the reticle perpendicular to the substrate surface when the reticle is illuminated in transmission mode, such that the pattern becomes visible relative to the remaining substrate surface by said visible light scattering at the groove surfaces in the transmission mode when viewed from a direction perpendicular to the substrate surface.

2. The reticle of claim 1, wherein:

the reticle is an illuminatable reticle wherein electrically powered illumination light is to be coupled into the substrate from an edge of the substrate and guided within the substrate between the front and back substrate surfaces; and, said surface roughness of the groove surfaces is large enough to scatter the electrically powered illumination light guided within the substrate at the groove surfaces so as to couple out a portion of said electrically powered illumination light guided in the substrate in a direction perpendicular to the substrate surface, such that the pattern is illuminated appearing bright relative to the remaining substrate surface when viewed from a direction perpendicular to the substrate surface.

3. A reticle for a telescope, the reticle comprising:

a visible pattern in a transparent substrate;

wherein the pattern is made of open grooves which are engraved in a surface of the transparent substrate, the engraved open grooves defining groove surfaces;

wherein the groove surfaces have a surface roughness defined by the parameter $S_q$ according to ISO 25178-2 being larger than or equal to 10 nm to scatter visible light directed onto the reticle perpendicular to the substrate surface when the reticle is illuminated in transmission mode, such that the pattern becomes visible relative to the remaining substrate surface by said visible light scattering at the groove surfaces in the transmission mode when viewed from a direction perpendicular to the substrate surface; and, wherein the reticle is defined by at least one of the following parameters:

the engraved open grooves in the surface of the transparent substrate have a width FWHM (w) between 1 μm to 8 μm;

the engraved open grooves in the surface of the transparent substrate have a depth (d) between 5 μm and 20 μm;

the engraved open grooves in the surface of the transparent substrate have an aspect ratio, defined as width FWHM (w) divided by depth (d), of smaller than or equal to 2; and, the engraved open grooves form horizontal and/or vertical lines and have a substantially trapezoidal cross section with a slope angle (α) of the lateral groove surfaces to the substrate surface of between 40° and 80°.

4. The reticle of claim 1, wherein the engraved open grooves form crosshairs of horizontal and vertical lines and the reticle includes at least one engraved open beam in the substrate surface in a peripheral portion radially distal from the center of the crosshairs and wherein the at least one engraved open beam has a larger width than the engraved open grooves of the crosshairs in the center and wherein the surface roughness of the groove surfaces of the crosshairs and the at least one engraved open beam is substantially equal.

5. The reticle of claim 1, wherein the reticle is in the form of a ballistic reticle having engraved open alignment lines and/or engraved open alignment dots and wherein the surface roughness of the engraved open grooves of the crosshairs and the engraved open alignment lines and/or the engraved open alignment dots is substantially equal.

6. The reticle of claim 1, wherein:

the reticle includes at least one intransparent deposited structure on the substrate surface, in particular at least one bar of deposited metal on the substrate surface; and/or, the transparent substrate is coated, in particular anti-reflex-coated, and wherein the coating is interrupted by the engraved open grooves.

7. A sighting telescope having first and second focal planes, the sighting telescope comprising:

a reticle having a visible pattern in a transparent substrate for said sighting telescope;

wherein the pattern is made of open grooves which are engraved in a surface of the transparent substrate, the engraved open grooves defining groove surfaces;

wherein the groove surfaces have a surface roughness defined by the parameter $S_q$ according to ISO 25178-2 being larger than or equal to 10 nm to scatter visible light directed onto the reticle perpendicular to the substrate surface when the reticle is illuminated in transmission mode, such that the pattern becomes visible relative to the remaining substrate surface by said visible light scattering at the groove surfaces in the transmission mode when viewed from a direction perpendicular to the substrate surface;

said reticle being mounted near the first or second focal plane of the sighting telescope; and, illumination means for illuminating the reticle from an edge.

8. A method of making a reticle for a telescope, the reticle having a visible pattern in a transparent substrate for said sighting telescope; the pattern being made of open grooves which are engraved in a surface of the transparent substrate, the engraved open grooves defining groove surfaces; and, the groove surfaces having a surface roughness which is large enough to scatter light directed onto the reticle perpendicular to the substrate surface when the reticle is illuminated in transmission mode, such that the pattern becomes visible relative to the remaining substrate surface by said light scattering at the groove surfaces in the transmission mode when viewed from a direction perpendicular to the substrate surface; the method comprising the steps of:

a) providing a laser system adapted to produce a pulsed focused laser beam, b) mounting a transparent substrate in said laser system, c) with said pulsed focused laser beam directly engraving open grooves in a surface of the transparent substrate to form said visible pattern, wherein exposed groove surfaces are created, wherein in said step c) said groove surfaces are created with a surface roughness which is large enough to scatter light directed onto the reticle perpendicular to the substrate surface when the reticle is illuminated in transmission mode, such that the pattern becomes visible relative to the remaining substrate surface by said light scattering at the groove surfaces in the transmission mode when viewed from a direction perpendicular to the substrate surface.

9. The method of claim 8, wherein the pulse duration and power of the pulsed focused laser beam is adapted to effect cold ablation of the substrate material at the substrate surface thereby removing the substrate material at the substrate surface creating said open grooves.

10. A method of making a reticle for a telescope, the reticle having a visible pattern in a transparent substrate for said sighting telescope; the pattern being made of open grooves which are engraved in a surface of the transparent substrate, the engraved open grooves defining groove surfaces; and, the groove surfaces having a surface roughness which is large enough to scatter light directed onto the reticle perpendicular to the substrate surface when the reticle is illuminated in transmission mode, such that the pattern becomes visible relative to the remaining substrate surface by said light scattering at the groove surfaces in the transmission mode when viewed from a direction perpendicular to the substrate surface; the method comprising the steps of:
 a) providing a laser system adapted to produce a pulsed focused laser beam,
 b) mounting a transparent substrate in said laser system,
 c) with said pulsed focused laser beam directly engraving open grooves in a surface of the transparent substrate to form said visible pattern, wherein exposed groove surfaces are created,
 wherein in said step c) said groove surfaces are created with a surface roughness which is large enough to scatter light directed onto the reticle perpendicular to the substrate surface when the reticle is illuminated in transmission mode, such that the pattern becomes visible relative to the remaining substrate surface by said light scattering at the groove surfaces in the transmission mode when viewed from a direction perpendicular to the substrate surface; and,
 wherein in said step c) the laser system is operated to generate a pulsed focused laser beam with at least one of the following parameters:
  the pulse energy of the pulsed focused laser beam in the focus is 0.5 µJ to 8 µJ,
  the power of the laser pulse in the focus of the pulsed focused laser beam is at least 0.025 µJ/ps,
  the laser is an UV-laser,
  the pulsed focused laser beam has a pulse length of ≤20 ps,
  the FWHM diameter of the pulsed focused laser beam in the focus is ≤10 µm,
  the focal length of the pulsed focused laser beam is ≤100 mm,
  the pulsed focused laser beam is scanned over the substrate surface with a laser spot spacing along the scan direction of <3 µm,
  the pulsed focused laser beam is scanned over the substrate surface with a laser spot spacing transversal to the scan direction of ≤10 µm.

11. A method of making a reticle for a telescope, the reticle having a visible pattern in a transparent substrate for said sighting telescope; the pattern being made of open grooves which are engraved in a surface of the transparent substrate, the engraved open grooves defining groove surfaces; and, the groove surfaces having a surface roughness which is large enough to scatter light directed onto the reticle perpendicular to the substrate surface when the reticle is illuminated in transmission mode, such that the pattern becomes visible relative to the remaining substrate surface by said light scattering at the groove surfaces in the transmission mode when viewed from a direction perpendicular to the substrate surface; the method comprising the steps of:
 a) providing a laser system adapted to produce a pulsed focused laser beam,
 b) mounting a transparent substrate in said laser system,
 c) with said pulsed focused laser beam directly engraving open grooves in a surface of the transparent substrate to form said visible pattern, wherein exposed groove surfaces are created,
 wherein in said step c) said groove surfaces are created with a surface roughness which is large enough to scatter light directed onto the reticle perpendicular to the substrate surface when the reticle is illuminated in transmission mode, such that the pattern becomes visible relative to the remaining substrate surface by said light scattering at the groove surfaces in the transmission mode when viewed from a direction perpendicular to the substrate surface; and,
 wherein in said step c) the open grooves are engraved with at least one of the following parameters:
  said open grooves are engraved in the surface of the transparent substrate with a depth between 5 µm and 20 µm,
  said open grooves are engraved in the surface of the transparent substrate with a width FWHM between 1 µm to 8 µm,
  said open grooves are engraved in the surface of the transparent substrate with an aspect ratio, defined as width FWHM divided by depth, of smaller than or equal to 2,
  said open grooves are engraved in the surface of the transparent substrate forming horizontal and/or vertical lines and having a substantially trapezoidal cross section with a slope angle ($\alpha$) of the lateral groove surfaces to the substrate surface of between 40° and 80°.

12. The method of claim 8, wherein in said step c) said open grooves are engraved in the substrate surface including crosshairs in the substrate surface in a central portion of the reticle and at least one engraved open beam in the substrate surface in a peripheral portion radially distal from the center of the crosshairs and wherein said at least one open beam is engraved with a larger width (w) than the engraved open grooves of the crosshairs in the same working step c).

13. The method of claim 8, wherein in said step b) a transparent substrate is provided having a metal coating and wherein said metal coating is partially removed to form a structured metal coating on the substrate surface, wherein the structured removal of the metal coating and the engraving of the open grooves is effected by the same laser system with different laser settings of the laser beam.

14. The method of claim 8, wherein the transparent substrate is polished and/or coated before said steps b) and c) so that the open grooves are engraved with the pulsed focused laser beam in the surface of the already polished and/or already coated substrate.

* * * * *